United States Patent [19]
Levine

[11] 4,334,275
[45] Jun. 8, 1982

[54] ENERGY AUDITING KIT

[76] Inventor: Marshall S. Levine, 538 Old Eagle School Rd., Wayne, Pa. 18087

[21] Appl. No.: 186,077

[22] Filed: Sep. 11, 1980

[51] Int. Cl.$^3$ .......................... G06F 15/20; G06F 3/12
[52] U.S. Cl. ................................. 364/551; 165/11 R; 364/506
[58] Field of Search ............... 364/505, 506, 550, 551, 364/900; 165/11 R

[56] References Cited

U.S. PATENT DOCUMENTS

| | | | |
|---|---|---|---|
| 3,995,686 | 12/1976 | Laube | 165/11 R |
| 3,998,093 | 12/1976 | Bertolasi | 364/550 X |
| 4,109,704 | 8/1978 | Spethmann | 364/505 X |
| 4,200,910 | 4/1980 | Hall | 165/11 X |
| 4,234,927 | 11/1980 | First | 165/11 R X |

*Primary Examiner*—Jerry Smith
*Attorney, Agent, or Firm*—Caesar, Rivise, Bernstein & Cohen, Ltd.

[57] ABSTRACT

A portable, self-contained kit for on site auditing of the energy consumption characteristics of a building having a heating system and for providing a permanent written record of said audit. The kit includes measuring means for measuring various parameters relating to the energy consumption characteristics of the building and computing means including input means and printer means. The kit also comprises audit form means including at least one page having text portions preprinted thereon at predetermined spaced locations and blank areas located immediately adjacent respective text portions. The blank areas are arranged for mounting a section of a printer output tape thereon. The input means is arranged to provide input data in the form of measured parameters and other source data to the computing means for analysis. The printer produces an output tape strip having plural groups of data relating to the heating system printed thereon, with the data of each of the groups being disposed at predetermined spaced locations from one another within the group. The tape strip is arranged to be severed into plural sections, with each section containing a respective group of data. Each of the strip sections is arranged for mounting and securement within an associated blank area on the audit form means so that the data printed on the strip section align with the text which has been preprinted on the form to provide a readily readable, permanent report identifying various energy consumption characteristics of the building.

20 Claims, 7 Drawing Figures

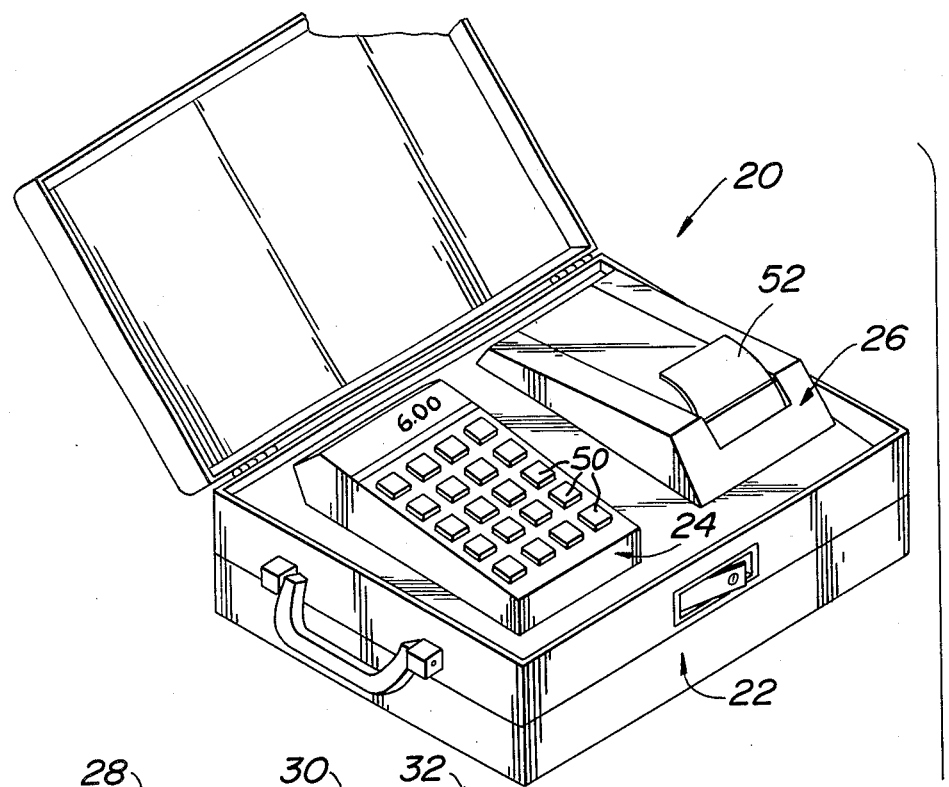
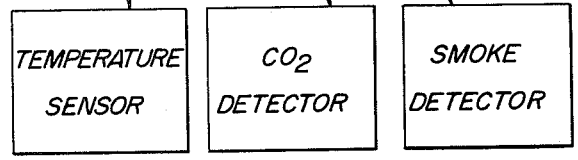
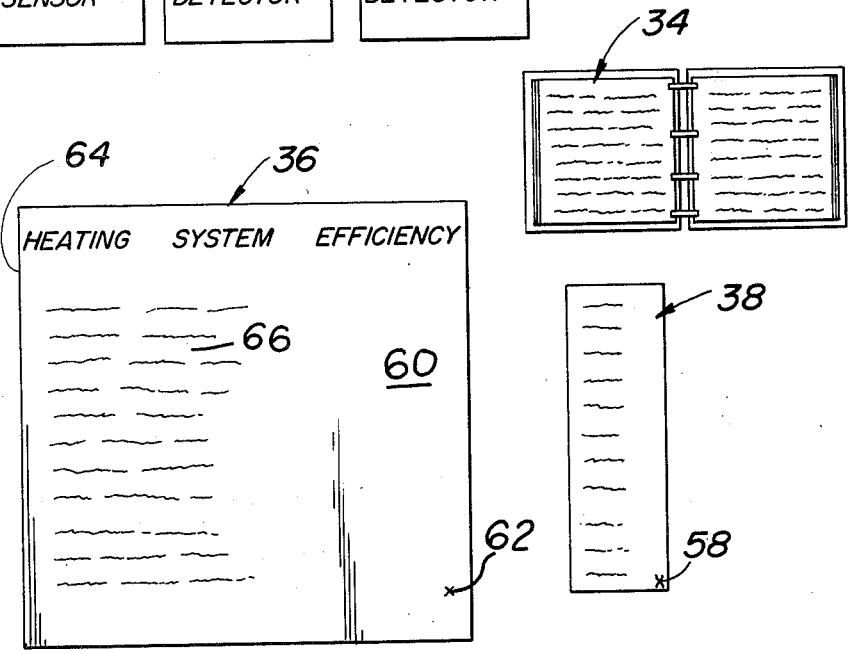
FIG. 1

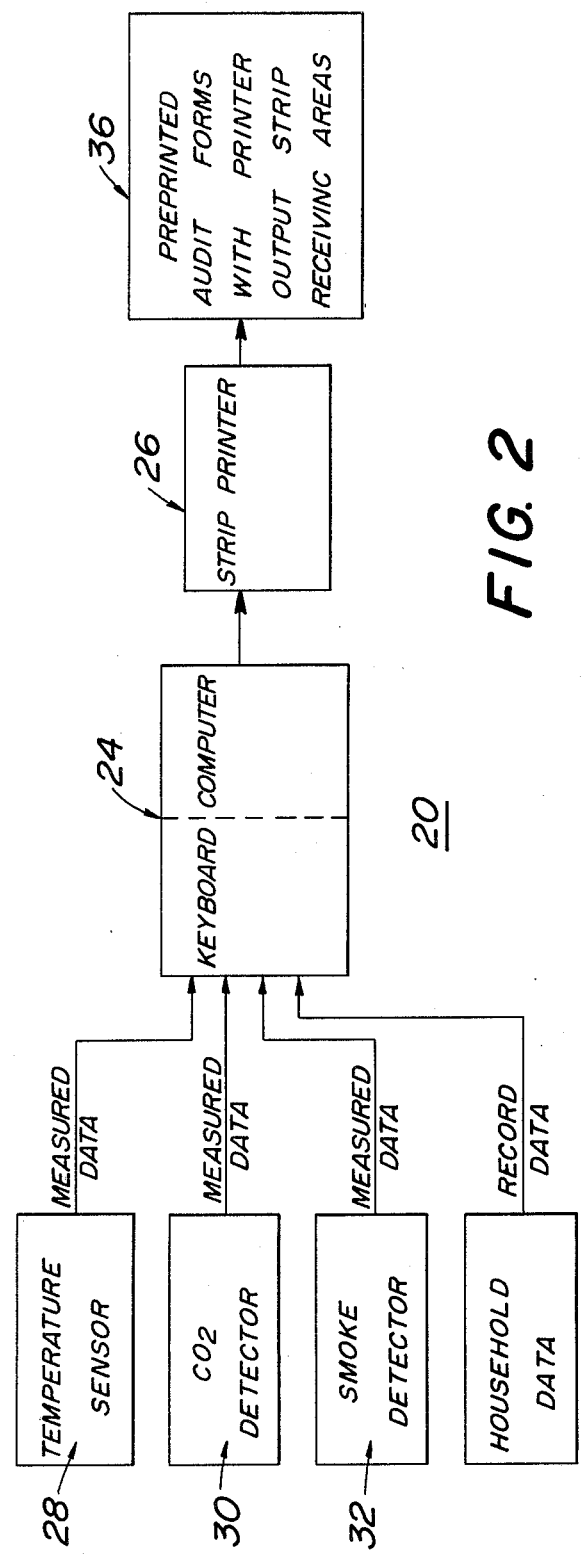

HEATING SYSTEM EFFICIENCY
Measurements and Analysis of Your Present System

The measurements listed below were analyzed by our computer to reveal the vital performance characteristics of your heating system.

MEASUREMENTS

- Measured Flue Temperature ............ °F.
  (Optimum 400-500°F. absolute)
- Measured $CO_2$ Value ............ %
  (Optimum $10^2$ - 12%)
- Smoke Reading ............ #
  (Normal range 0-2)
- Current Yearly Fuel Costs ............ $
- Present Night Temperature ............ °F.
- Future Night Temperature ............ °F.
- Present Day Temperature ............ °F.
- Future Day Temperature ............ °F.

ANALYSIS

- PEAK SYSTEM EFFICIENCY ............ %
  (Optimum 80-85%)
  This is computed peak performance of your present system without consideration of chimney losses.

- STAND-BY LOSSES ............ %
  This represents primarily the loss of efficiency due to heat escape up the chimney.

- NET EFFICIENCY (Seasonal) ............ %
  (Optimum 75-80%)
  This represents the average performance of your system over a typical heating season.

*FIG. 3*

ENERGY AUDITING KIT

This invention relates generally to energy conservation and more particularly to a kit for providing an analysis of energy consumption within a building.

The energy crisis has resulted in a long overdue public awareness of energy wastage. One particular aspect of the rising energy consciousness has been the public awareness of wastage in residential buildings. To that end, various concerns are in existence for providing an analysis of existing fuel consumption characteristics in the residence by the measurement of various heating system parameters and by reference to fuel usage and temperature data provided by the homeowner. In order to provide a detailed analysis of the fuel usage conditions based upon such input data, computer modeling techniques are sometimes used. However, such analyses are of limited utility in that the analysis is frequently accomplished at a later time and at a remote location. Moreover, the analyzed data produced using prior art auditing techniques frequently is presented in an unstructured manner, i.e., as a mass of data which may be complex and difficult for the homeowner to understand.

Accordingly, it is a general object of the instant invention to provide a kit for providing an energy audit of a building which overcomes the disadvantages of the prior art.

It is a further object of this invention to provide a kit designed to promote residential energy consumption through a structured and unbiased presentation of existing, as well as projected, energy consumption characteristics of the residence.

It is still a further object of this invention to provide a kit for providing an energy audit of a building on site and with the output data generated by computer and presented in a permanent report or record for the homeowner.

It is still a further object of this invention to provide a self-contained kit for auditing energy consumption characteristics of a building and which serves as a marketing tool to effectuate the marketing of various retrofit options for the residence to decrease energy consumption.

It is still a further object of this invention to provide a kit for auditing energy consumption characteristics of the residence which includes an interactive computer so that auditing personnel, while in the home, may evaluate various retrofit strategies with the homeowner in response to inquiries of the homeowner.

It is yet a further object of this invention to provide a permanent energy audit report including computer generated output data presented in a structured and cogent order.

These and other objects of the instant invention are achieved by providing a portable kit for on site auditing of the energy consumption characteristics of a building having a heating system and for providing a permanent written record of said audit. The kit comprises audit form means including first and second areas, each of said first areas having indicia preprinted thereon at predetermined spaced locations from one another and each of said second areas being located immediately adjacent a respective first area and arranged for mounting a section of a printer output strip tape thereon. The kit includes measuring means for measuring various parameters relating to the energy consumption characteristics of the building and computing means including input means and printer means. The input means is arranged to provide input data in the form of measured parameters and other source data to the computing means for analysis. The printer means operates in response to the computing means to produce an output tape strip having plural groups of indicia printed thereon, with the indicia of each of the groups being disposed at predetermined spaced locations from one another within the group. The tape strip is arranged to be severed into plural sections, with each section containing a respective group of indicia. Each of the strip sections is arranged for mounting and securement within an associated second area on the audit form means so that the indicia printed on the strip section align with the indicia which has been preprinted on the form to provide a readily readable, permanent report identifying various energy consumption characteristics of the building.

Other objects and many of the attendant advantages of the instant invention will become readily apparent by reference to the accompanying drawing wherein:

FIG. 1 is a view, partially in perspective, partially in plan and partially in functional block diagram form of the kit of the instant invention;

FIG. 2 is a functional block diagram showing the interaction of the components of the kit of FIG. 1;

FIG. 3 is a plan view of one page of a multi-page audit record forming a portion of the kit of FIG. 1;

Figure 4:
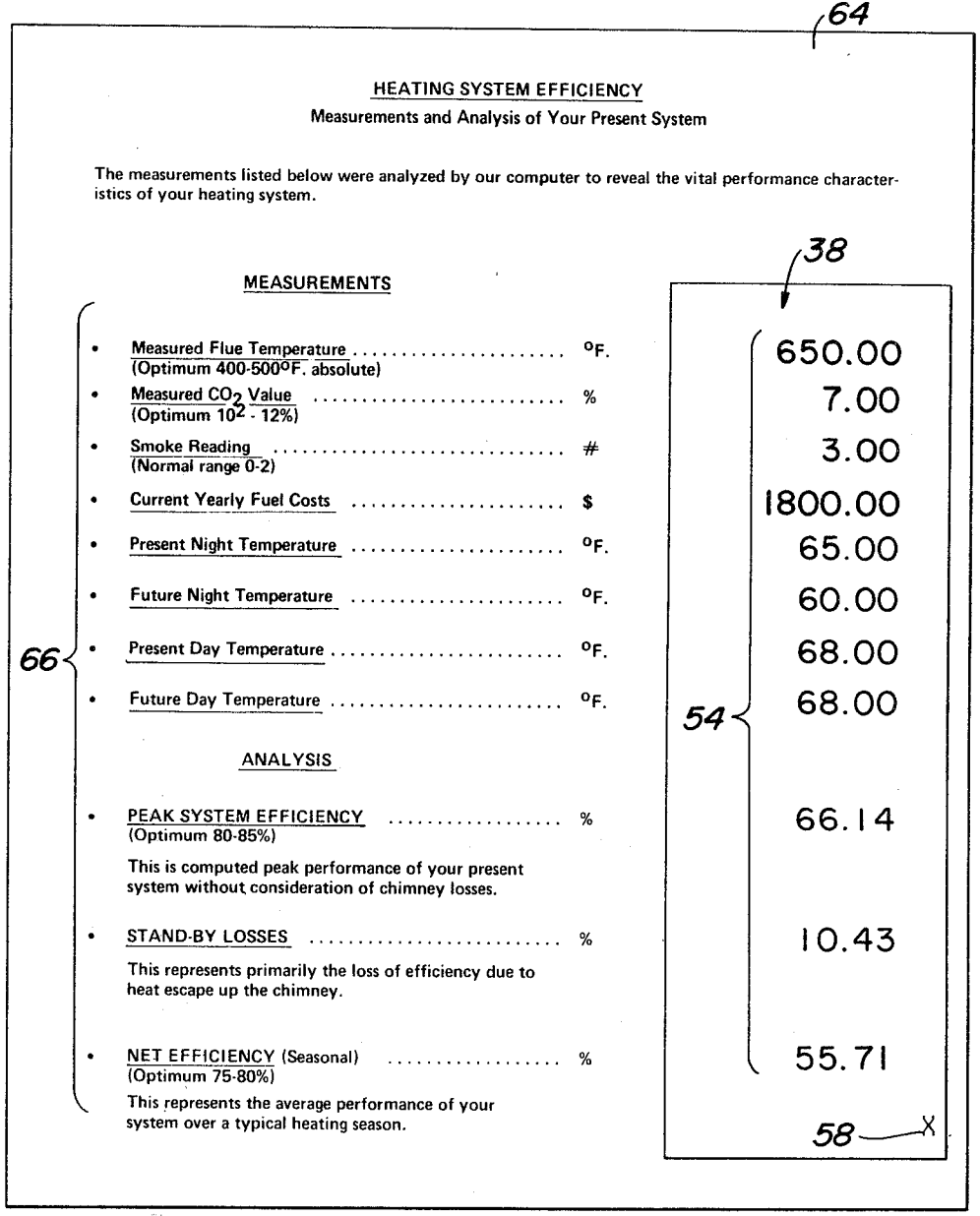
FIG. 4 is a plan view, similar to that of FIG. 3 but showing the page after receipt of a computer printout strip section.

Referring now in greater detail to the various figures of the drawing wherein like reference characters refer to like parts, there is shown generally at 20 in FIG. 1 a portable kit for the on site auditing of the energy consumption characteristics of a building having a heating system and for providing a permanent written record of the audit.

The kit is self-contained within a carrying case 22 for ease of portability to the building being audited and basically comprises small computing means 24, an associated printer 26, conventional temperature sensor means 28, conventional carbon dioxide detecting means 30, conventional smoke detecting means 32, an instruction booklet 34, and at least one preprinted energy report form 36.

The system 20 is arranged to be brought into the residence building by service personnel or by sales personnel of a fuel company to analyze its energy consumption characteristics and to suggest possible retrofit options to reduce fuel wastage. To that end, the kit is arranged to provide the homeowner or resident with a heating system combustion audit, a fuel comparison study (e.g., oil versus gas), an audit concerning the insulation of the building, a solar energy audit or an audit to optimize the burner firing rate. In the interest of expediting the understanding of this application, only the heating system combustion audit will be described in detail herein, with the other audits merely being described in general terms.

The heating system combustion audit is arranged to provide the customer with a comprehensive analysis of the seasonal performance of the dwelling's heating system. Based on standard combustion measurements, the computer in combination of the printer generates a printout which, when combined with the preprinted report form, produce a permanent report. This report includes the analysis of the heating system as it stands and in addition, recommends specific upgrading measures with corresponding fuel reductions based upon the substitution of any combination of a new heating system, a flame retention burner, an automatic stack damper, a boiler temperature modulator or a clock thermostat. The audit report also sets forth a 15-year payback analysis and 15-year fuel savings projections for any of the upgrading measures selected.

The fuel comparison study compares the fuel cost savings from a particular recommended oil heat retrofit option to the fuel cost saving from a natural gas conversion (gas conversion burner or complete gas boiler or furnace).

The whole house energy audit provides a report of the heat loss of the residential building envelope, e.g., through windows, walls, etc.

The firing rate audit estimates the design heating load of a resistance and derives a designed firing rate, that is the optimum nozzle size for the heating load only, while providing a recommended firing rate.

The heating system combustion audit is accomplished by the salesman and homeowner taking various measurements of the existing heating system. In addition, the homeowner furnishes various record information, e.g., annual fuel cost for the residence. The measured data and the record data is entered into the computer in the presence of the homeowner so that the homeowner sees everything that is done. The computer operates on the input data in accordance with its algorithm complement and the printer prints out the results of the computation on the printer's tape strip. The printed information on the output strip is severed at predetermined locations and the severed strip sections are secured to the preprinted report form to provide a permanent record of the seasonal efficiency, peak system efficiency and standby losses of the existing system. Seasonal efficiencies are directly related to fuel savings. The seasonal data is used by the computer to produce a long range financial analysis comparing the fuel costs with homeowner-selected retrofit strategies to the fuel costs with the existing heating system.

The computer is interactive, such that the sales personnel can evaluate several retrofit strategies with the homeowner while in the home. In this way purchase decisions are more likely to occur during the sales call, thereby precluding the expense of a repeat visit or the reduced sales appeal and impact of audit results mailed to the homeowner.

The audit report which is generated by securing the output data tape strips to various portions of the preprinted audit forms serves as an effective sales tool that can be left with the homeowner for future reference. In addition, the computer printout includes plots of curves for both the existing heating system and the retrofitted heating system which characterize the efficiency of the system across an entire heating season. Also, as a part of the printout, an audit summary is produced listing all inputs and output data for the salesperson's records.

The algorithm complement for the computing means is in the form of software but can, if desired, be in firmware. The system algorithms are set forth in Table 2 hereafter and include the various terms, whose definitions are set forth in the following Table 1:

TABLE 1

| SYMBOL | DESCRIPTION | UNITS |
| --- | --- | --- |
| $T_s$ | Gross stack (flue) Temperature | °F. |
| $T_r$ | room temperature | °F. |
| $CO_2$ | $CO_2$ content in flue gas | % |
| S | Smoke Reading by ASTM D-2156-65 filter paper method | dimensionless |
| P | Current annual fuel cost | $ |
| $T_{np}$ | Present night thermostat setting | °F. |
| $T_{nf}$ | Future night thermostat setting | °F. |
| $T_{dp}$ | Present day thermostat setting | °F. |
| $T_{df}$ | Future day thermostat setting | °F. |
| $C_s$ | Heating system type (constant) | dimensionless |
| $NCO_2$ | Corrected $CO_2$ content | % |
| $E_{ss}$ | Steady-state efficiency of present heating system | % |
| $L_{st}$ | Standby loss | % |
| $E_s$ | Annual fuel utilization (seasonal) efficiency of present heating system | % |
| $FR_a$ | Fuel reduction from new boiler/furnace | % |
| $E_{sr}$ | Rated seasonal efficiency of new boiler/furnace | % |
| $\Delta T_s$ | Flue gas temperature reduction from new flame retention burner | °F. |
| $NE_{ss}$ | Steady state efficiency with new flame retention burner | % |
| $FR_b$ | Fuel reduction from new flame retention burner | ° |
| $FR_c$ | Fuel reduction from installation of motorized stack damper | % |
| $FR_d$ | Fuel reduction from installation of boiler water temperature modulator | % |
| $FR_e$ | Fuel reduction from installation of clock thermostat | % |
| $\Sigma FR_a$ | Summation of any fuel reduction due to any combed retrofit options | % |
| $\Sigma F_x$ | Cummulative fuel expense | $ |
| $\Sigma F_s$ | Cummulative fuel savings | $ |

The system algorithms set forth in Table 2 have been developed by my reference to, and in some cases modifications of, previous research of others conducted at Walden Division of Abcor, Inc. (under contract to the National Bureau of Standards), Honeywell Corporation, United States Department of Energy (DOE), Brookhaven National Laboratories, and the National Bureau of Standards and Federal Trade Commission, and which previous research is the subject of the following papers: Batey, J. E. Allen, T. W. McDonald, R. G., Hoppe, R. J., Salzano, F. J., and Berlad, A. L., Direct Measurement of the Overall Efficiency and Annual Fuel Consumption of Residential Oil-fired Boilers, Annual Report Fiscal Year 1977, BNL 50833; Batey, J. E., McDonald, R. F., and Hoppe, R. J., Reduction of residential Fuel Oil Consumption by Vent Dampers, BNL 26467, May, 1979; Berlad, A. L., Lin, H. C., Batey, J., Salzano, F. J., Yu, W. S., Hoppe, R. J., and Allen, T. W., Seasonal Performance and Energy Costs of Oil or Gas-Fired Boilers and Furnaces, BNL 50647, March, 1977; Batey, J. E., Gazero, V. Salzano, F. J., and Berlad, A. L., Energy Management in Residential and Small Commercial Buildings, BNL 50576, July 1976; Berlad, A. L., A Field Method for Determination of the Performance Parameters of an Operating Structure and its Heating System, BNL 50684, June, 1977; Bonne, U., Johnson, A. E., Glatzel, J., and Torborg, R., Analysis of New England Oil Burner Data—Effect of Reducting Excess Firing Rate on Seasonal Efficiency, Final Report by Honeywell Corporate Research Center on NBS Contract 514736, August, 1975; Bonne, U., Janssen, J. E., Schreiber, J., et al, Determination of Efficiency and Operating Cost of Residential Central Combustion Heating Systems, NBS Contract No. 6-35838; Chi, J., DEPAF—A Computer Model for Design and Performance Analysis of Furnaces, AICHE-ASME Heat Transfer Conference, Salt Lake City, Utah, ASME Paper No. 77-HT-11, August, 1977; Janssen, J. E., and Bonne, U., Improvement of Seasonal Efficiency of Residential Heating Systems, ASME Winter Meeting, New York N.Y., Dec. 5-10, 1976; Janssen, J. E., Torborg, R. H., and Bonne, U., Measurement of Heating System Dynamics for Computation of Seasonal Efficiency; Findings Reports and Refit Tests File, Brookhaven National Laboratory, Burner-Boiler/Furnance Efficiency Test Project; Katzman, L., and Weitzman, D., A Study to Evaluate the Effect of Reducing Firing Rates on Residential Oil Burner Installations, Walden Division of Abcor, Inc., Contract No. 6-35738, U.S. Dept. of Commerce (NBS); Katzman L., and Monat, J., Study to Evaluate the Energy Efficiency Improvement of Residential Heating Equipment Modifications, Walden Division of Abcor, Inc., Contract No. 7-35747, U.S. Dept. of Commerce (NBS), May, 1978; Kelly, G. E., and Chi, J., A Method for Estimating the Seasonal Performance of Residential Gas and Oil-Fired Heating Systems, National Bureau of Standards; Kelley, G. E., and Chi, J., Recommended Testing and Calculation Procedures for Determining the Seasonal Performance of Residential Central Furnaces and Boilers, National Bureau of Standards; Richardson, D. L., Wilson R. P., Ashley L. E., Butterfield, J. F., Automatic Vent Dampter Study, Arthur D. Little, Inc., Contract No. 04-60663-00, July, 1977; Richardson, D. L., Wilson, R. P., Ashley L. E., Butterfield, J. F., An assessment of Retrofit Automatic Vent Dampers for Residential Heating Systems, Arthur D. Little, Inc., Cambridge, Mass., November, 1977; and U.S. Dept. of Energy, Final Energy Conservation Test Procedures, Federal Register, Vol. 43, No. 91, May, 10, 1978.

With warm air or hot water heating systems having a separate water heater $C_s$ is 1.0. If the system is coal converted $C_s$ is 1.65. With hot water heating systems having a tankless coil converted, $C_s$ is 1.4. If the system is coal converted, $C_s$ is 1.95. With steam heating systems having a separate water heater, $C_s$ is 1.3, unless it is coal converted, in which case $C_s$ is 1.9. If the steam system has a tankless coil, $C_s$ is 1.6, unless it is coal converted, in which case $C_s$ is 2.3.

TABLE 2

| | SYSTEM ALGORITHMS |
|---|---|
| EQUATION NO. | ALGORITHM |
| EQ (1): | $NCO_2 = CO_2 - 0.5S$ where $NCO_2 \geq 5\%$ |
| EQ (2): | $E_{ss} = 91 - \dfrac{(20 - NCO_2)(T_s - T_r)}{70(NCO_2)^{\frac{1}{2}} + 180}$ |
| EQ (3): | $L_{st} = 22C_s(1 - E_{ss}/100)$ |
| EQ (4): | $E_s = E_{ss} - L_{st}$ |
| EQ (5): | $FR_a = 100(E_{sr} - E_s)/E_{sr}$ |
| EQ (6): | $\Delta T_s = 0.5\, T_s - 200$ |
| EQ (7): | $NE_{ss} = 91 - \dfrac{(20 - NCO_2)[(T_s - \Delta T_s) - T_r]}{70(NCO_2)^{\frac{1}{2}} + 180}$ where $NCO_2 = 10\%$ |
| EQ (8): | $FR_b = 100(NE_{ss} - E_{ss})(1.2)/NE_{ss}$ |
| EQ (9): | $FR_c = 0.6L_{st} + 2$ |
| EQ (10): | $FR_d = 32(C_s)^{0.55}(1 - E_{ss}/100)$ |
| EQ (11): | $FR_e = [13(T_{np} - T_{nf})]^{\frac{1}{2}} + [10(T_{dp} - T_{df})]^{\frac{1}{2}}$ |
| EQ (12): | $FR_{ad} = FR_a + [32(C_s)^{0.55}(1 - 86/100)]$ |
| EQ (13): | $FR_{ae} = FR_a + FR_e(1 - FR_a/100)$ |
| EQ (14): | $FR_{ade} = FR_a + 4.48(C_s)^{0.55} + FR_e(1 - [FR_a + 4.48(C_s)^{0.55}]/100)$ |
| EQ (15): | $FR_{bc} = FR_b + 0.6[22(C_s)(1 - NE_{ss}/100] + 2$ |
| EQ (16): | $FR_{bd} = FR_b + [32(C_s)^{0.55}(0.14)]$ |
| EQ (17): | $FR_{be} = FR_b + FR_e(1 - FR_b/100)$ |
| EQ (18): | $FR_{bcd} = FR_b + 0.6[22(C_s)(1 - NE_{ss}/100)] + 2 + 32(C_s)^{0.55}(1 - NE_{ss}/100)$ |
| EQ (19): | $FR_{bce} = FR_b + 0.6[22(C_s)(1 - NE_{ss}/100)] + 2 + FR_e(1 - [FR_b + 13.2(C_s)(1 - NE_{ss}/100) + 2]/100)$ |
| EQ (20): | $FR_{bde} = FR_b + 32\,(C_s)^{0.55}(1 - NE_{ss}/100) + FR_e(1 - [FR_b + 32(C_s)^{0.55}(1 - NE_{ss}/100)]/100)$ |
| EQ (21): | $FR_{bcde} = FR_b + [13.2(C_s)(1 - NE_{ss}/100) + 2] + [32(C_s)^{0.55}(0.14)] + FR_e(1 - [13.2(C_s)(1 - NE_{ss}/100) + 2 + 4.48\,C_s^{0.55}]/100$ |
| EQ (22): | $FR_{cd} = FR_c + FR_d$ |
| EQ (23): | $FR_{ce} = FR_c + FR_e(1 - FR_c/100)$ |
| EQ (24): | $FR_{de} = FR_d + FR_e(1 - FR_d/100)$ |
| EQ (25): | $FR_{cde} = FR_c + FR_d + FR_e[1 - (FR_c + FR_d)/100]$ |
| EQ (26): | $\Sigma F_x = \sum\limits_{15}^{n=i}(1 + i)^n P$ where $i = 0.15$; $n =$ number of years |
| EQ (27): | $\Sigma F_x = (FR_{a...e})\,\Sigma\,(1 + i)^n P - $ Investment |

TABLE 2-continued

SYSTEM ALGORITHMS

EQUATION NO. ALGORITHM where $i = 0.15$; $n$ = number of years

Several of the above identified algorithms include correction factors which have been incorporated to alter off-cycle losses for systems using tankless coils, for steam, hot water, or warm air systems, and for coal converted heating plants.

The derivation of the fuel savings associated with each retrofit device, that is the result of equations EQ (6), EQ (8), EQ (9), EQ (10) and EQ (11) of Table 2, is based upon the foregoing technical documents and/or tested procedures. Fuel saving is adjusted in the event that two or more retrofit options are selected which affect the same dynamic function in the heating system, therefore, the combined fuel savings of multiple retrofit devices is always less than addative total. This factor is taken into account in equations EQ (12)-EQ (25) of Table 2. Moreover, the computer program does not include algorithms for some retrofit combinations which are not appropriate or which would be inadvertently used, such as the installation of an entire heating plant and the installation of a flame retention burner. The retrofit options which are addressed in the computer and which are established by the equations EQ (6), EQ (8)-EQ (25) are the use of new boilers and furnaces, new flame retention burners, motorized stack dampers, boiler water temperature modulators and clock thermostats.

New boilers or furnaces are projected to have, on the average, seasonal efficiencies of 78%. New seasonal efficiencies resulting from the installation of flame retention burners are derived by assuming a carbon dioxide value of 10%, a reduction in stack temperature as a function of the existing gross stack temperature, and a smoke number of 0. Motorized stack dampers are assigned a fixed percentage reduction in off-cycle losses, which increase the seasonal efficiency. Since there are at least two distinctly different types of stack dampers, namely, delayed closing and damper blade bypasses, and it is unknown which type is being offered by each particular user, fuel savings reflect average values. Fuel savings from boiler temperature modulators represent not only the least documented alternative, but also the most difficult to predict. These devices or control schemes are particularly sensitive to several uncontrolled parameters, such as the relationship between outdoor and boiler water temperature which can be established by the homeowner or whether a tankless coil exists or not and others. The fuel saving algorithm is developed for an average northeast climate and the average boiler temperature settings recommended by a major manufacturer of such devices. With regard to the savings from clock thermostats, such savings are broken down into night setback and/or day setback. The fuel saving contribution from night setback exceeds the contribution from day setback. Since the fuel savings is a function of outdoor climate, an average northeastern weather pattern has been used in the computer model.

The financial analysis algorithms project cumulative fuel cost over 15 years for the existing system and compare it to the 15-year comulative fuel cost for the recommended retrofit to reveal savings resulting from the retrofit. The financial algorithms include an estimated 15% annual fuel cost rise.

In a commercial embodiment of kit 20, the computer 24 is a conventional programable calculator, such as a Texas Instrument Model 59, and is interconnected to a conventional printer, such as a PC Model 100C. The algorithms for the calculator are stored in the calculator's memory by inserting conventional magnetic cards bearing the algorithms and machine instructions. Input data and machine instructions for the calculator are entered into the computer, via the depression of selected input keys 50. The order of data entry into the computer is set forth in the instruction booklet 34 of the kit 20.

To effect the heating system combustion audit, three existing furnace conditions are required for measurement. To that end, the kit includes a temperature sensor 28, a $CO_2$ detector 30 and a smoke detector 32.

The temperature sensor is preferably a thermometer and is arranged to be inserted into the furnace flue to measure the flue gas temperature. This measurement provides significant insight into the heating system efficiency since a flue temperature is indicative of furnace efficiency. The lower limit of flue gas temperature for conventional furnaces is approximately 300° F., with typical heating systems exhibiting temperatures in the range of 500° F. to 600° F. and with poor systems in the 700° F. to 800° F. range.

The $CO_2$ detector 30 comprises a tube (not shown) which is arranged to be inserted into the flue to extract a sample for either electronic or chemical analysis to provide a measurement of the percentage of carbon dioxide in the flue gases. This measurement reflects the amount of air exiting the furnace. As is known, residential furnaces are normally operated with substantially excess air over that needed to support combustion in order to keep the system clean of soot and the like. However, the existence of too much excess air robs the heating system of efficiency since valuable fuel is consumed in heating the excess air exiting the flue. Thus, the $CO_2$ measurement also provides significant insight into the efficiency of the heating system.

The smoke detector 32 basically comprises a pump, like a bicycle pump, for extracting smoke from the flue. The smoke is trapped in a filter and the color of the filter compared to a convention gray scale, all of which is included in the kit 20, to give a number indicative of the degree of smoke in the flue. Since smoke and carbon produced by the furnace build up a protective layer or barrier on the furnace's heat exchanger, the amount of smoke in the flue provides further significant insight in determining the heating system efficiency.

Bachrach Company of Pittsburgh, Pa., offers a test kit including a temperature sensor (thermometer), a $CO_2$ detector (tube and chemical analysis components) and a smoke detector (pump, filter and gray scale) which can be used to form the components 28, 30 and 32, respectively, of kit 20.

After the readings of the temperature sensor 28, $CO_2$ detector 30 and smoke detector 32 are taken, those values are keyed into the computer by depressing keys 50 in the sequence set forth in booklet 34. Other data which is based upon information provided by the homeowner is then keyboarded into the computer in the sequence also set forth in booklet 34. The information provided from the homeowner consists of record information, such as current yearly fuel costs, the present night temperature in the residence, the future night temperature which could exist if a clock thermostat was used, the present day temperature in the residence and the future day temperature which could exist if a clock thermostat was used.

Once all of the foregoing input data has been keyed into the computer, the computer operates on the input data in accordance with its algorithm complement to provide various output data. This data is printed on the tape strip 52 by the printer 26. The tape strip is of relatively narrow width, e.g., 3 inches.

In accordance with the preferred aspects of this invention, the output data generated by the computer is printed in groups 54 on the tape strip. The strip portion containing one group is arranged to be severed from the remaining tape to form a strip section for mounting in the audit report. The data printed in each strip section 38 is printed at predetermined spaced locations, with the amount of spacing being predetermined by the computer. In addition, a registration mark 58 is printed in the lower right corner of each strip section 38.

In order to provide the homeowner with a permanent record of the energy audit, the kit 20 includes the aforementioned audit report form 36. The audit report form contains several pages including substantial text material preprinted thereon at predetermined locations, several pages include blank tape strip securing areas 60, each of which includes a respective registration or alignment mark 62 preprinted thereon. The areas 60 are disposed adjacent the preprinted text.

In FIG. 3 there is shown one page, identified by the reference numeral 64, of a commercial embodiment of the audit report form 36 for the heating system audit. To that end, the page 64 includes text material 66 printed on the left hand side of the page. The text is arranged in a column of various input parameters which are identified under the heading "Measurements" and by various output characteristics identified under the heading "Analysis". Examples of the "Measurement" text lines are: "Measured Flue Temperature", "Measured $CO_2$ Value", etc. Examples of the "Analysis" text are "Peak System Efficiency", "Stand-by Losses", etc. Each of the text portions for the individual "Measurements" are separated from one another by a first predetermined spacing, while the "Analysis" text portions are separated from one another by a second predetermined spacing.

The right hand side of page 64 forms the tape receiving areas 60 and as noted earlier, is blank except for the registration mark 62 preprinted in the lower right hand corner thereof.

When the input data is keyboarded into the computer, each entry is printed on the tape strip 52, with the spacing between the printed data being equal to the first spacing between the "Measurement" text lines on page 64. The output data corresponding to the "Peak System Efficiency", "Stand-by Losses" and "Net Efficiency" are printed on the tape strip spaced from each other by the spacing between the "Analysis" text lines on page 64. The registration mark 58 is printed at the end of the end of the data group 54 of the section 38 at a predetermined location with respect to data making up that group so that when the tape section 38 is severed from the tape strip 52 and located on area 60, with the registration mark 58 aligned with the registration mark 62, the data printed by the printer on the strip aligns with the preprinted text on the page. In FIG. 4 page 62 is shown after the tape section 38 bearing the printed data corresponding to "Measurements" and "Analysis" is secured in place, with the registration marks aligned.

Figure 5:
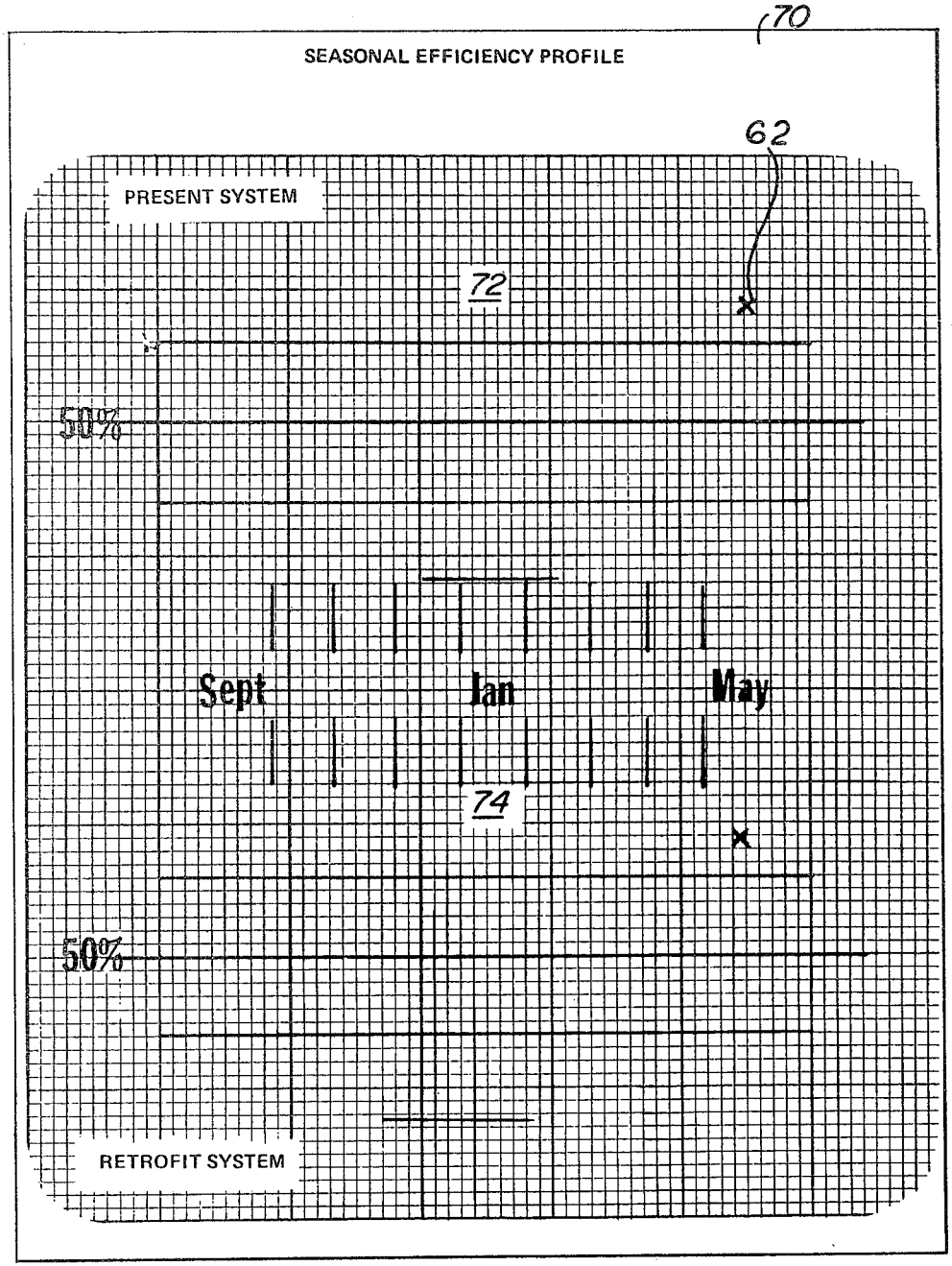
FIG. 5 is a plan view of another page of the audit report.

The computer also includes in its memory, a program for the generation of graphs representing the seasonal efficiency profile of the existing system or of any retrofit system as selected by the homeowner. In this connection, the audit report book includes a page, identified by the reference numeral 70, shown in FIG. 5, having graduations preprinted thereon. The upper portion 72 of the page bears the legend "Present System" and is arranged to receive a tape strip section to form a graph showing the seasonal efficiency profile of the existing system. The lower portion 74 of the page bears the legend "Retrofit System" and is arranged to receive a tape strip section to form a graph showing the seasonal efficiency profile for any retrofit system. To that end, as can be seen, each graph portion includes a horizontal line identified by the legend 50%. The abscissa of each graph portion graduated in the months of the year, starting with September in the leftmost portion and ending in May in the rightmost portion so that the center of the absissa is in the height of the heating season. Each of the graph portions 72 and 74 also includes a respective registration mark 76.

Figure 6:
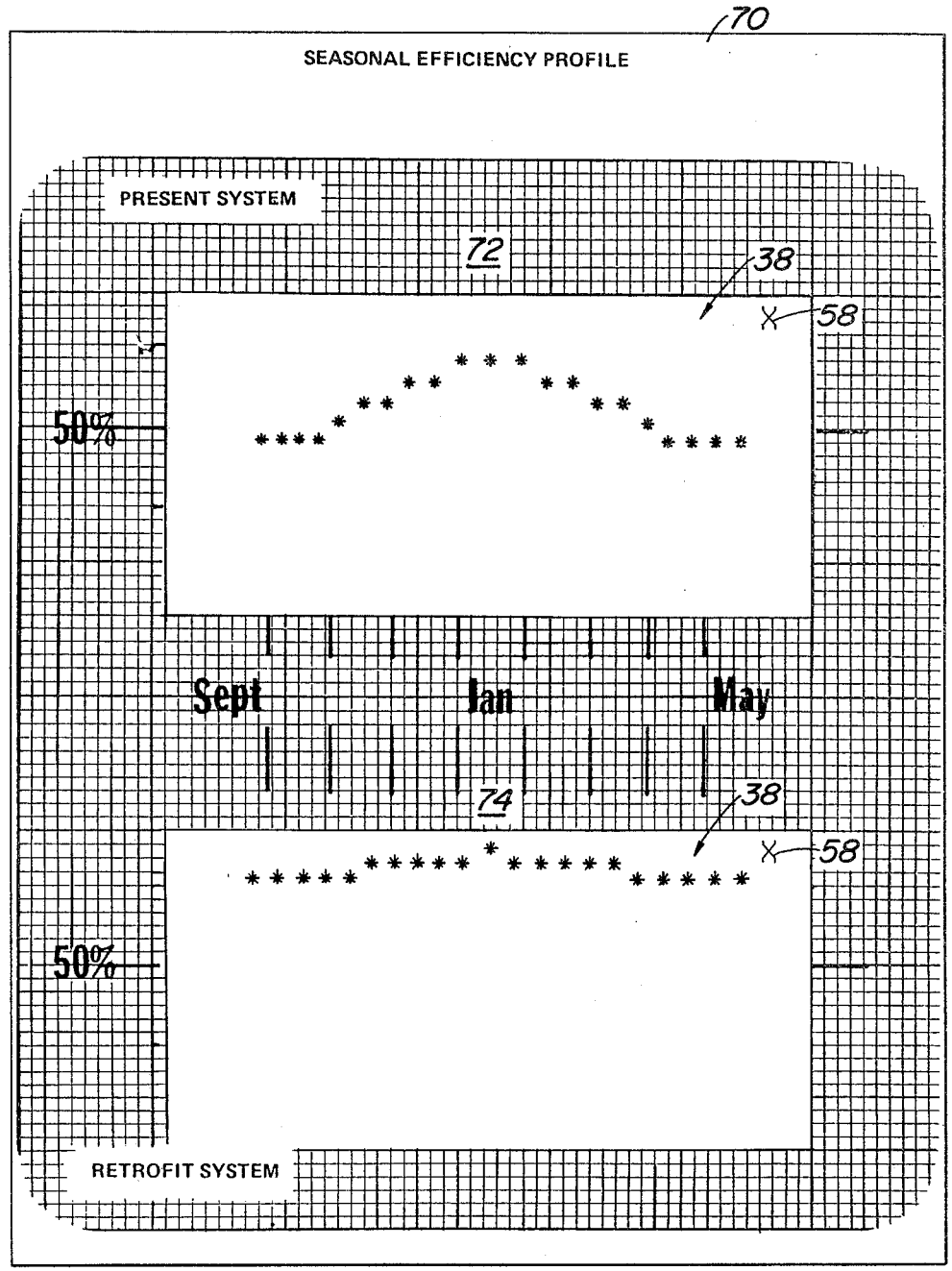
FIG. 6 is a plan view, similar to that of FIG. 5, but showing the page of FIG. 5 after receipt of two sections of the computer printout strip.

After the tape section 38 bearing the numerical data shown in FIG. 4, is printed, the printer automatically and under the control of the computer, prints a group of asterisks which forms a graphical representation of the seasonal efficiency profile of the existing system described by the numerical printout of the "Analysis" data. The tape strip portion including this graphical representation also includes a registration mark printed thereon 58 so that when that portion is severed from the strip 52, the resulting tape section with the seasona. profile can be secured to the preprinted page 70 to form the graph of the existing seasonal efficiency profile. To that end, the strip section is located on the upper graph portion 72 so that the alignment mark on the tape section aligns with the printed alignment mark on the graph section 72 as shown in FIG. 6.

Use of the kit 20 for a typical heating efficiency audit is as follows:

The instruction booklet 34 gives specific instructions to the salesman to effect the programming of the calculator to accomplish an energy system audit. This is accomplished by depressing the keys 917. This enables the calculator to be programmed with the energy audit algorithms and machine instructions by the insertion of magnetic program cards into the calculator. The calculator is now ready for receipt of input information regarding the heating system. To that end, the instruction booklet 34 requests the salesman to choose initially whether the heating system has a separate hot water tank or whether it has a tankless, i.e., a summer/winter, coil. By way of example, it shall be assumed that the system has a tankless coil. Thus, button 4 is depressed. Then booklet 34 requests that a code for the type of existing heating system, i.e., warm air system, hot water system or steam system, be entered into the calculator. It will be assumed that the system is a hot water system. This necessitates the depression of input key B as set forth in booklet 34.

At each step, during the entry of data, the computer displays the step number on its alpha-numeric display panel.

The gross stack temperature measured by temperature sensor 28 is entered in Step 2. It shall be assumed in this example that that the gross stack temperature is 650° F. In Step 3, the percentage of $CO_2$ in the stack (as determined by the $CO_2$ detector 30) is entered. For this example, it shall be assumed that there is 7% $CO_2$ in the flue, thus, 7.00 is entered. The gray scale reading of the smoke detector 32 is then entered in Step 4. For this example, it shall be assumed that the gray scale reading is 3.

After the entry of the smoke reading into the computer, the homeowner's record information is entered starting with Step 5. In that Step 5 the current yearly fuel costs (as identified by the homeowner) is keyed into the computer. The homeowner is then requested to reveal the present night temperature within the residence. This temperature is entered into the computer in Step 6. The homeowner is then requested to state the minimum nightly temperature which could be accepted in the residence, assuming that the heating system included a clock thermostat to raise the temperature to higher level in the morning. This "future" night temperature is entered into the computer in Step 7. Next, the homeowner is asked to identify the present day temperature within the home. This temperature is entered as Step 8 in the computer. Finally, the homeowner is asked to identify the lowest acceptable temperature during the day, assuming again the use of a clock thermostat. This temperature is entered as Step 9 in the computer. In the hypothetical heating system, it shall be assumed that the current yearly fuel cost is $1,800.00, the present night temperature is 65°, the future night temperature is 60°, the present day temperature is 68° and the future day temperature is 68°.

As each of the foregoing "Measurement" inputs are keyed into the computer, the printer prints that input data on its tape strip 52 as shown in FIG. 4.

After the last of the "Measurements" data inputs has been entered into the computer, the computer commences its calculations pursuant to instructions in its memory and based upon its algorithm complement. The printer then begins printing out the three "Analysis" data outputs, namely, "Peak System Efficiency", "Stand-By Losses" and "Net Efficiency". In the example given above, the tape strip has printed thereon the figures 66.14 for peak system efficiency, 10.43 for stand-by losses and 55.71 for net efficiency. In addition, the printer prints the registration mark 58 followed by a string of 3 or 4 asterisks (not shown).

After the printer has completed the printing of the output data, the section of the strip 52 carrying the input and output data is severed from the tape strip in the printer to produce the tape section 38. This tape strip section is then placed on area 60 of the audit report's page 64, with the registration mark 58 on the tape strip section 38 aligned with the registration mark 62 in the tape strip receiving area 60. The strip section 38 is then secured in place by any suitable means, such as adhesive tape (not shown).

As can be seen in FIG. 4, once the tape strip 38 is secured in place, one can readily read the "Measurement" and "Analysis" for each of the various parameters of the heating system. Thus, in the example given heretofore, the homeowner has before him a permanent record revealing the peak performance of his present heating system, as set forth in the "Peak System Efficiency" parameter is 66.14%, while the stand-by losses of the system is 10.43% and the net efficiency on the seasonal basis is 55.71%. The latter figure represents what is also referred to as the "Annual Fuel Utilization Efficiency".

After completing the printing of the tape strips section 38 including the "Measurements" and "Analysis" data as just described, the printer, under the control of the computer prints out a series or group of asterisks on the next portion of the tape 52. These asterisks form a graph representing the seasonal efficiency of the existing heating system. The printer also prints a registration mark 58 adjacent the group of asterisks forming the graph. In FIG. 6 there is shown the tape strip 38 having the graph printed thereon and secured to the graph portion 72 of the audit report page 70. Thus, the homeowner can readily see how the present system's effifiency profiles over the entire heating season. In the example system, it can be seen that even in the peak heating period the operating efficiency of the system is well below 100%, yet in the fall and spring, when the heating system operates even less efficiently, the efficiency is substantially lower, e.g., approximately 50%. If the graph 72 where plotted as an average, it would extend as an horizontal line at the level 55.71%, representing the net seasonal efficiency as printed in the numerical "Analysis" output.

Once the seasonal efficiency profile for the present system has been produced, the printer then begins printing another group of output data. This group of output data represents estimated efficiency improvements of the home's heating system in the event that each of five potential modification stragedies or retrofits of the heating system were made. Those five modification strategies entail, the replacement of the entire furnace or boiler including new burner and controls, the replacement of the present burner with a flame retention system, the installation of an automatic stack damper to eliminate heat escape up the chimney during off cycle of the system, the installation of a boiler water modulator or the installation of a clock thermostat to permit optimized management of temperature during non-use hours. The output data for the five retrofit strategies is calculated from the equations EQ (5), EQ (7)-EQ (11) and for the example given above consists of the numbers 28.57, 20.05, 7.74, 13.04 and 8.06, representing the reduction in fuel cost with replacement of the entire furnace, replacement of a burner with a flame retention burner, installation of an automatic stack damper, installation of modulating controls and installation of a clock thermostat, respectively. In the interest of drawing simplicity, the tape strip section bearing the foregoing retrofit option data has not been shown in the drawing since it is similar to that shown heretofore, namely, the column of numbers and a registration mark.

The strip section 38 carrying the estimated efficiency improvements for the five modification strategies is then secured to a page (not shown) of the audit report form book having text preprinted thereon relating the modification strategies, with the data printed on the strip disposed adjacent to the preprinted text so that the homeowner can readily understand the various output data relating to the modification strategies.

After printing out the five modification strategy improvements, the printer commences printing another group of output data, which data represents the present system's operating costs, beginning with the current yearly fuel cost, e.g., $1,800.00. The computer then calculates on a year-by-year basis, and the printer prints out as a data group, the cumulative expense of the present heating system for the next fifteen years, including in the calculations an estimated 15% rise in fuel costs each year. Like the other printed strip sections, a registration mark is printed on the tape associated with the operating cost output data group. This strip section is then severed from the tape strip and secured to another page of the report in a similar manner as described with the other tape sections so that the homeowner can readily see what his present heating system will cost on a cumulative basis for the next 15 years.

After printing the present existing system operating costs data, the computer ceases further operation and displays the number 10.00 on its display. This indicates that the computer is now ready to provide an analysis of the heating system if a combination of two or more of the five modification strategies previously identified is selected for study.

As set forth in the instruction booklet 34, depression of key A assumes replacement of the entire furnace, depression of key B assumes replacement of the present burner with the flame retention burner, depression of key C assumes installation of an automatic stack damper, depression of key D assumes installation of modulating controls and depression of key E assumes installations of a clock thermostat.

Assuming that the homeowner wishes to have an analysis of his heating system, if the system were modified or retrofitted to include a new boiler and a clock thermostat, keys A and E are depressed. The cost of making these modifications of the heating system is then entered into the computer. In the hypothetical system, it is assumed that the cost of a new boiler and clock thermostat is $2,000.00. Once the data is entered, the computer then begins calculating and the printer begins printing the fuel reduction percent for the retrofit combination entered. In this case, the fuel reduction percent printed on the output tape strip is 34.33%.

It should be noted that the fuel reduction percent for the combination is less than the total if each of the individual modifications were added to each other since there is always some interaction between individual modifications when combined. For example, if the clock thermostat turns the temperature off for a predetermined number of hours during the night, the savings from a new boiler will be reduced because the boiler is not in operation during the night.

The computer then calculates and the printer prints the savings to the homeowner each year for the next 15 years assuming that the two modification strategies discussed above are incorporated into the heating system. The tape section bearing such financial projections is arranged to be secured in the audit report on the page adjacent the financial projections for the existing system to provide a readily perceivable comparison how much money would be saved over the next 15 years by the selection of that retrofit combination. In the example given above, the saving is $27,401.00.

In addition to printing out the financial projections for the combined retrofit stragedy, the printer also prints out a series of asterisks to form a graph showing the seasonal efficiency profile for that retrofit stragedy. The tape section bearing the graph for the retrofitted system is then secured in area 74 of page 70 by aligning the alignment mark 58 on the tape strip section to the alignment mark on the page. Thus, as can be seen in FIG. 6, the use of a new boiler and the clock thermostat has the effect of raising and flattening the graph of the seasonal efficiency across the heating season.

During the audit, the homeowner can select other combinations of retrofit options for evaluation. Each retrofit modification being evaluated occurs as described heretofore, with tape sections bearing the fuel reduction and financial savings for each retrofit option being secured over previously evaluated retrofit modifications in the permanent record.

As should be apparent from the foregoing, the interaction between the homeowner and the computer so that the homeowner is enabled to interrogate the computer for various retrofit combinations, enables the homeowner to accurately assess various energy saving modifications for his home heating system. This assessment is carried on in a logical and structured order with presentation of output data provided in a permanent and informative audit report.

The computer is arranged to cause the printer to print out audit summary data for mounting in an Audit Summary Report to be kept by the salesman. The audit summary tape sections have the same data printed thereon as printed in for the homeowner's audit report to provide the salesman with a permanent record of the audit.

Figure 7:
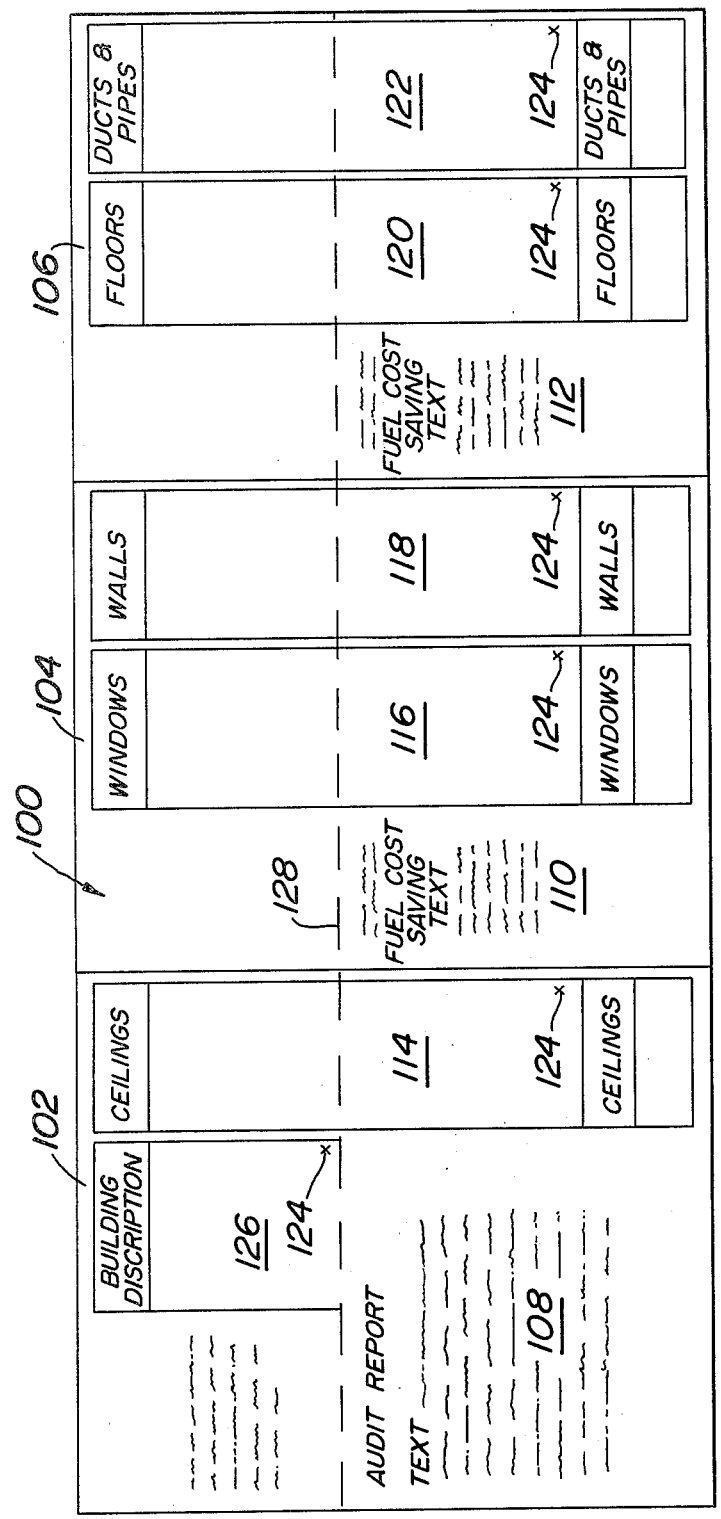
FIG. 7 is a plan view of an alternative audit report of the instant invention.

In FIG. 7 there is shown a preprinted audit report form 100 for the "Whole House Energy Audit". As can be seen, the report form 100 includes a plurality of interconnected pages, 102, 104 and 106 including text material 108, 110 and 112, respectively, printed on the left side of the pages. The right side of page 102 includes a tape strip receiving areas 114, the right side of page 104 includes a pair of tape strip receiving areas 116 and 118 and the right side of page 106 includes a pair of tape strip areas receiving areas 120 and 122. Each area includes a registration mark 124 preprinted in the lower right hand corner thereof. Each of the areas 114–122 is adapted to receive a respective tape strip section printed by the computer including data regarding various thermal insulation characteristics of the residence. For example, area 114 includes the word "Ceiling" printed in the top and bottom thereof since said area is adapted to receive the tape strip section involving ceiling insulation. Similarly, area 116 includes the word "Windows" printed at the top and bottom thereof, area 118 includes the word "Wall" printed at the top and bottom thereof, area 120 includes the word "Floors" printed at the top and bottom thereof and area 122 includes the words "Ducts and Pipes" printed at the top and bottom thereof. On page 102 there is area 126 including the words "Building Description" printed at the top thereof. Area 126 also includes registration mark 124 in the lower right hand corner thereof.

In effecting the whole house audit, the computer causes the printer to print out duplicate or redundant information in each group of data forming a tape section. To that end, some data printed at the upper portion of the tape section is also printed at the lower portion of the tape section. Accordingly, when each tape section is secured to its respective mounting area on the audit report page, some data is located on the top portion of the page and also on the bottom portion of the page.

As can be seen in FIG. 7, the pages 102, 104, and 106 each include a horizontal line 128 preprinted thereacross. This line serves as a dividing line to sever the upper portion of the audit report from the lower portion and is located at the position dividing the duplicate data on each of the output tape strip sections. Accordingly, once all the strip sections are secured in place, the booklet is severed along line 128. This creates two reports, one for the homeowner and one for the salesman's records.

As will be appreciated from the foregoing, the kit of the instant invention enables the in-the-home auditing of off cycle losses and overall utilization efficiency estimates by the making of traditional steady state measurements while predicting the fuel saving potential of various heating plan retrofit options. This provides for dramatic benefits to the salesperson conducting the audit by offering an immediate extension from standard measurements to seasonal efficiency values, since such values are directly related to fuel savings. From the seasonal data, a long range financial analysis is developed comparing the fuel costs with the user selected retrofit strategies to the fuel cost with the existing heating system. The computer is interactive so that sales personnel may evaluate several retrofit stragedies while in the home. In this way, purchase decisions are more likely to occur during the sales call, thereby precluding the expense of a second visit or the reduced input of mail-back audit results.

To enhance the presentation of the audit, an informative, permanent report is generated. This report serves as an effective sales tool that can be left with the homeowner. The computer output includes plots of curves for both the existing heating system and the retrofitted heating system which characterize the efficiency of the system across a heating season. Also, as a part of the printout, an audit summary is produced listing all input and output data for the salesperson's records.

Without further elaboration, the foregoing will so fully illustrate my invention that others may, by applying current or future knowledge, readily adapt the same for use under various conditions of service.

What is claimed as the invention is:

1. A portable kit for on site auditing of the energy consumption characteristics of a building having a heating system and for providing a permanent, written record of said audit, said kit comprising audit form means including first and second areas, each of said first areas having indicia preprinted thereon at predetermined spaced locations from one another, each of said second areas being located immediately adjacent a respective first area and arranged for mounting a section of a printer output strip thereon, measuring means for measuring various parameters relating to building energy consumption and computing means including input means and printer means, said input means being arranged to provide input data in the form of said measured parameters and other source data to said computing means for analysis, said printer means operating in response to said computing means to produce an output strip having plural groups of indicia printed thereon, with the indicia of each of said groups being disposed at predetermined spaced locations from one another within said group, said strip being arranged to be severed into plural sections, with each section containing a respective group of indicia, each of said strip sections being arranged for mounting and securement within an associated second area on said form means so that the indicia printed on said strip section align with the indicia preprinted on said form means to provide a readily readable, permanent report identifying various energy consumption characteristics of said building.

2. The kit of claim 1 where one of said groups consists of indicia indicating existing energy consumption conditions of said building and another of said groups consists of indicia predicting energy consumption characteristics for alternative heating system retrofit modifications.

3. The kit of claim 2 wherein at least one of said indicia groups comprise numerical indicia.

4. The kit of claim 3 wherein at least one of said indicia groups comprise graphic indicia.

5. The kit of claim 1 wherein an alignment mark is located in each of said second areas and an alignment mark is located in each strip section, and whereupon when said alignment mark of a strip section is aligned with the alignment mark of the second area of the audit form means the indicia printed on said strip section align with the indicia preprinted on said form means adjacent to said second area.

6. The kit of claim 5 wherein at least one of said groups provides indicia indicating the existing energy consumption conditions of said building and wherein another of said groups provides indicia predicting energy consumption characteristics for alternative heating system retrofit modifications.

7. The kit of claim 6 wherein at least one of said indicia groups comprises numerical indicia.

8. The kit of claim 7 wherein at least one of said indicia groups comprise graphic indicia.

9. The kit of claim 1 wherein at least one of said strip section includes redundant indicia printed thereon spaced from the remaining indicia comprising said group, whereupon when said strip section is secured in place on said audit form means, said form means may be severed along a predetermined line separating the redundant indicia from the remaining indicia to produce two permanent audit reports identifying various energy consumption characteristics of said building.

10. The kit of claim 9 wherein an alignment mark is printed by said printer adjacent each indicia group on said output strip and wherein each of said second areas includes an alignment mark, whereupon the alignment mark on said strip section is aligned with the alignment mark on said second area the indicia printed on said strip section aligned with the indicia preprinted on said first area of said form means.

11. A portable kit for on site auditing of the energy consumption characteristics of a building having a heating system and for providing a permanent, written record of said audit, said kit comprising audit form means including first and second areas, each of said first areas having indicia preprinted thereon at predetermined spaced locations from one another, each of said second areas being located immediately adjacent a respective first area and arranged for mounting a section of a printer output strip thereon, first measuring means for measuring the temperature of the heating system's flue gases, second measuring means for measuring the carbon dioxide in said flue, third means for measuring the smoke density in said flue, and computing means including a keyboard and printer means, said keyboard being arranged to provide input data to said computing means for analysis, said input data comprising data from said first, second and third measuring means and other source data relating to building energy consumption, said printer means operating in response to said computing means to produce an output strip having plural groups of indicia printed thereon, with the indicia of each of said groups being disposed at predetermined spaced locations from one another within said group, said strip being arranged to be severed into plural sections, with each section containing a respective group of indicia, each of said strip sections being arranged for mounting and securement within an associated second area on said form means so that the indicia printed on said strip section align with the indicia preprinted on said form means to provide a readily readable, permanent report identifying various energy consumption characteristics of said building.

12. The kit of claim 11 where one of said groups consists of indicia indicating existing energy consumption conditions of said building and another of said groups consists of indicia predicting energy consumption characteristics for alternative heating system retrofit modifications.

13. The kit of claim 12 wherein at least one of said indicia groups comprise numerical indicia.

14. The kit of claim 13 wherein at least one of said indicia groups comprise graphic indicia.

15. The kit of claim 11 wherein an alignment mark is located in each of said second areas and an alignment mark is located in each strip section, and whereupon when said alignment mark of a strip section is aligned with the alignment mark of the second area of the audit form means the indicia printed on said strip section align with the indicia preprinted on said form means adjacent to said second area.

16. The kit of claim 15 wherein at least one of said groups consists of indicia indicating the existing energy consumption conditions of said building and wherein another of said groups consists of indicia predicting energy consumption characteristics for alternative heating system retrofit modifications.

17. The kit of claim 16 wherein at least one of said indicia groups comprises numerical indicia.

18. The kit of claim 17 wherein at least one of said indicia groups comprise graphic indicia.

19. The kit of claim 11 wherein at least one of said strip sections includes redundant indicia printed thereon spaced from the remaining indicia comprising said group, whereupon when said strip section is secured in place on said audit form means, said form means may be severed along a predetermined line separating the redundant indicia from the remaining indicia to produce two permanent audit reports identifying various energy consumption characteristics of said building.

20. The kit of claim 19 wherein an alignment mark is printed by said printer adjacent each indicia group on said output strip and wherein each of said second areas includes an alignment mark, whereupon when the alignment mark on said strip section is aligned with the alignment mark on said second area the indicia printed on said strip section aligned with the indicia preprinted on said first area of said form means.

* * * * *